US012602177B1

(12) United States Patent
Doddaiah et al.

(10) Patent No.: US 12,602,177 B1
(45) Date of Patent: Apr. 14, 2026

(54) COMPOSABLE DPU CORE MATRIX FOR SUSTAINABLE SERVICE LEVELS

(71) Applicant: Dell Products L.P., Round Rock, TX (US)

(72) Inventors: Ramesh Doddaiah, Westborough, MA (US); Jonathan I. Krasner, Coventry, RI (US); Xiangping Chen, Sherborn, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/023,174

(22) Filed: Jan. 15, 2025

(51) Int. Cl.
G06F 3/06 (2006.01)

(52) U.S. Cl.
CPC .......... G06F 3/0629 (2013.01); G06F 3/0604 (2013.01); G06F 3/0683 (2013.01)

(58) Field of Classification Search
CPC .... G06F 3/0629; G06F 3/0604; G06F 3/0683; H04L 41/5003; H04L 41/2009; H04L 41/5025
See application file for complete search history.

(56) References Cited

U.S. PATENT DOCUMENTS

| | | | |
|---|---|---|---|
| 8,140,666 B2 * | 3/2012 | Dias | H04L 47/70 709/224 |
| 2022/0019352 A1 * | 1/2022 | Tripathi | G06F 3/0611 |
| 2023/0185456 A1 * | 6/2023 | Don | G06F 3/0653 711/111 |
| 2025/0013283 A1 * | 1/2025 | Martin | G06F 1/3268 |

FOREIGN PATENT DOCUMENTS

JP          2008225995     *  3/2007

* cited by examiner

*Primary Examiner* — Tracy C Chan
(74) *Attorney, Agent, or Firm* — Chamberlain, Hrdlicka, White, Williams & Aughtry; Aly Z. Dossa

(57) ABSTRACT

A method for adjusting data processing unit (DPU) utilization of a storage array, the method includes sampling input-output (IO) of the storage array, forecasting, based on the sampling, demand for the storage array, where the storage array include a DPU core matrix, and making a first determination, based on the forecasting, that at least one service level (SL) of multiple SLs associated with the DPU core matrix is out of compliance. The method further includes identifying, based on the first determination, at least one DPU of the DPU core matrix currently operating at a first SL, and adjusting, based on the first determination, operation of the at least one DPU to operate from the first SL to a second SL of the multiple SLs.

20 Claims, 6 Drawing Sheets

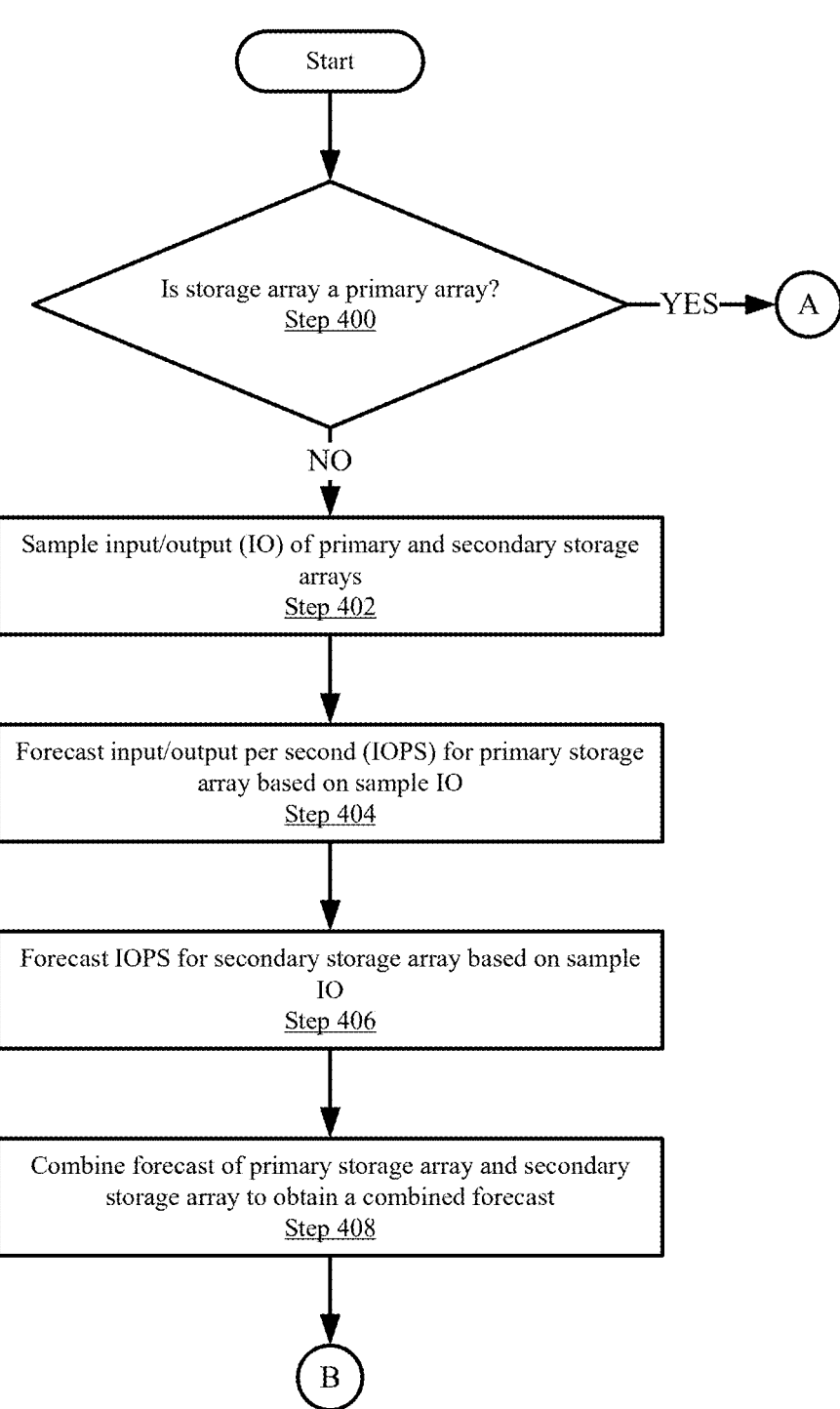
FIG. 4.1

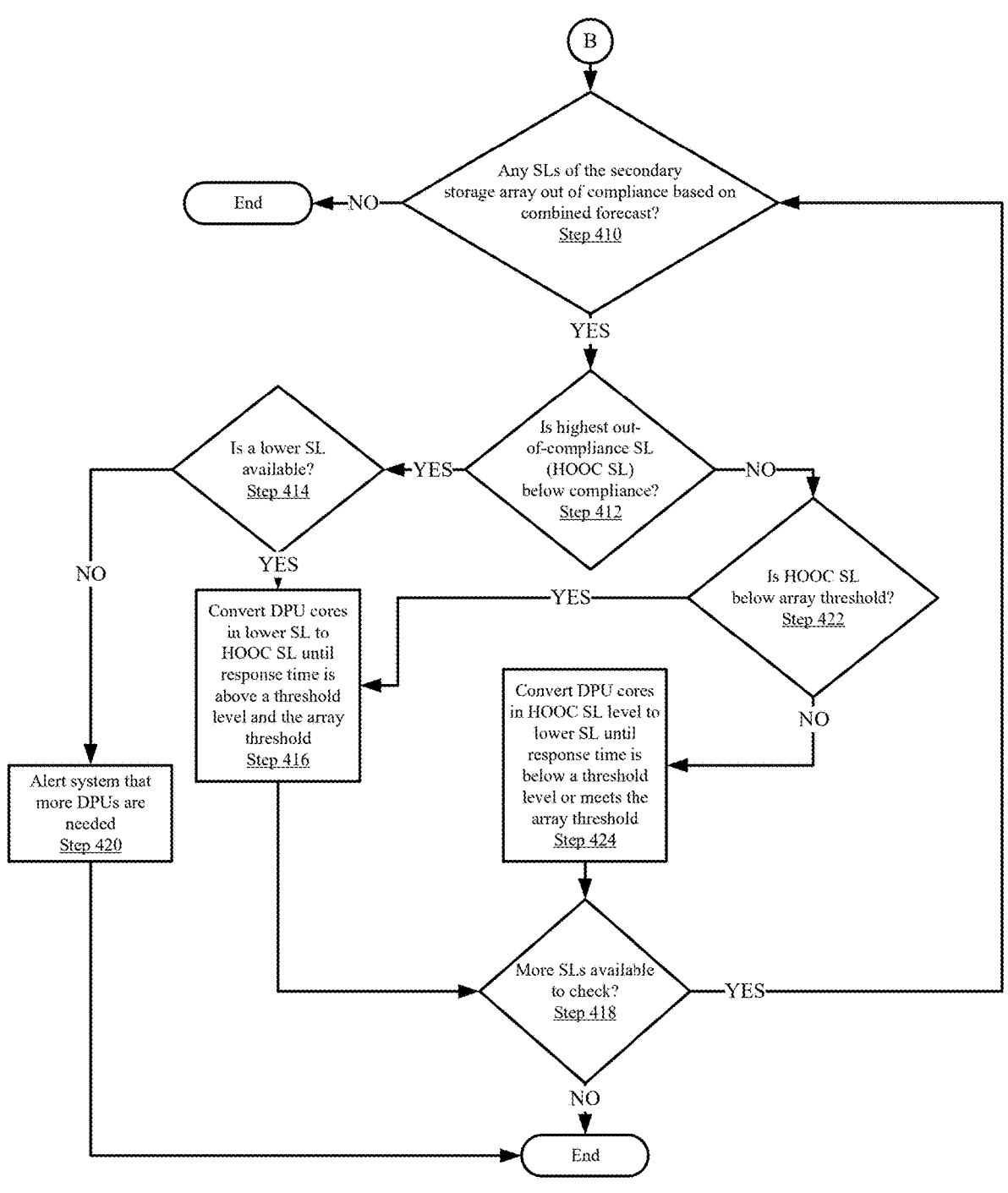
FIG. 4.2

500

Output
Device
512

Non-Persistent
Storage
504

Processor(s)
502

Persistent Storage
506

Communication
Interface
508

Input Device
510

COMPOSABLE DPU CORE MATRIX FOR SUSTAINABLE SERVICE LEVELS

BACKGROUND

Modern computing systems frequently incorporate storage arrays to manage data intensive requests. These storage arrays often leverage data processing units (DPUs) to offload workloads from other components in the systems such as central processing units (CPUs) to optimize performance. However, DPUs often consume a lot of power which can lead to high operational costs and reduced energy efficiency.

BRIEF DESCRIPTION OF DRAWINGS

Certain embodiments of the disclosure will now be described with reference to the accompanying drawings. However, the accompanying drawings illustrate only certain aspects or implementations of the disclosure by way of example and are not meant to limit the scope of the claims.

FIG. 4.1 shows a flowchart of a method for forecasting demand for a primary storage array and a secondary storage array in accordance with one or more embodiments.

FIG. 4.2 shows a flowchart of a method for adjusting DPU utilization of a secondary storage array in accordance with one or more embodiments.

DETAILED DESCRIPTION

Storage arrays are essential components in modern computing systems for managing and delegating a variety of storage operations. Storage arrays aggregate multiple storage devices to provide a unified and shared storage solution for various applications (e.g., databases, virtual machines (VMs), file servers, etc.). These arrays often rely on data processing units (DPUs) to handle the requests sent by the applications which vary in priority and performance goals. DPUs are often configured in matrices comprising many DPUs each configured to work together to fulfill the requests. All the DPUs in the DPU matrices often operate at full capacity, ensuring high performance but at a cost of significant energy consumption. Since storage requests vary in priority and performance goals, it is not always necessary for every DPU to run at full capacity. As such, there is a need to distribute workloads amongst DPUs to account for energy consumption and utilization forecasts.

Considering the limitations discussed above, the following disclosure includes a storage array with a DPU matrix with DPUs operating at gradient clock speeds and a DPU provisioning engine that adjusts the clock speeds of the individual DPUs of the DPU matrix based on the priority and performance goals of requests received by the storage array.

Specific embodiments will now be described with reference to the accompanying figures.

Figure 1:
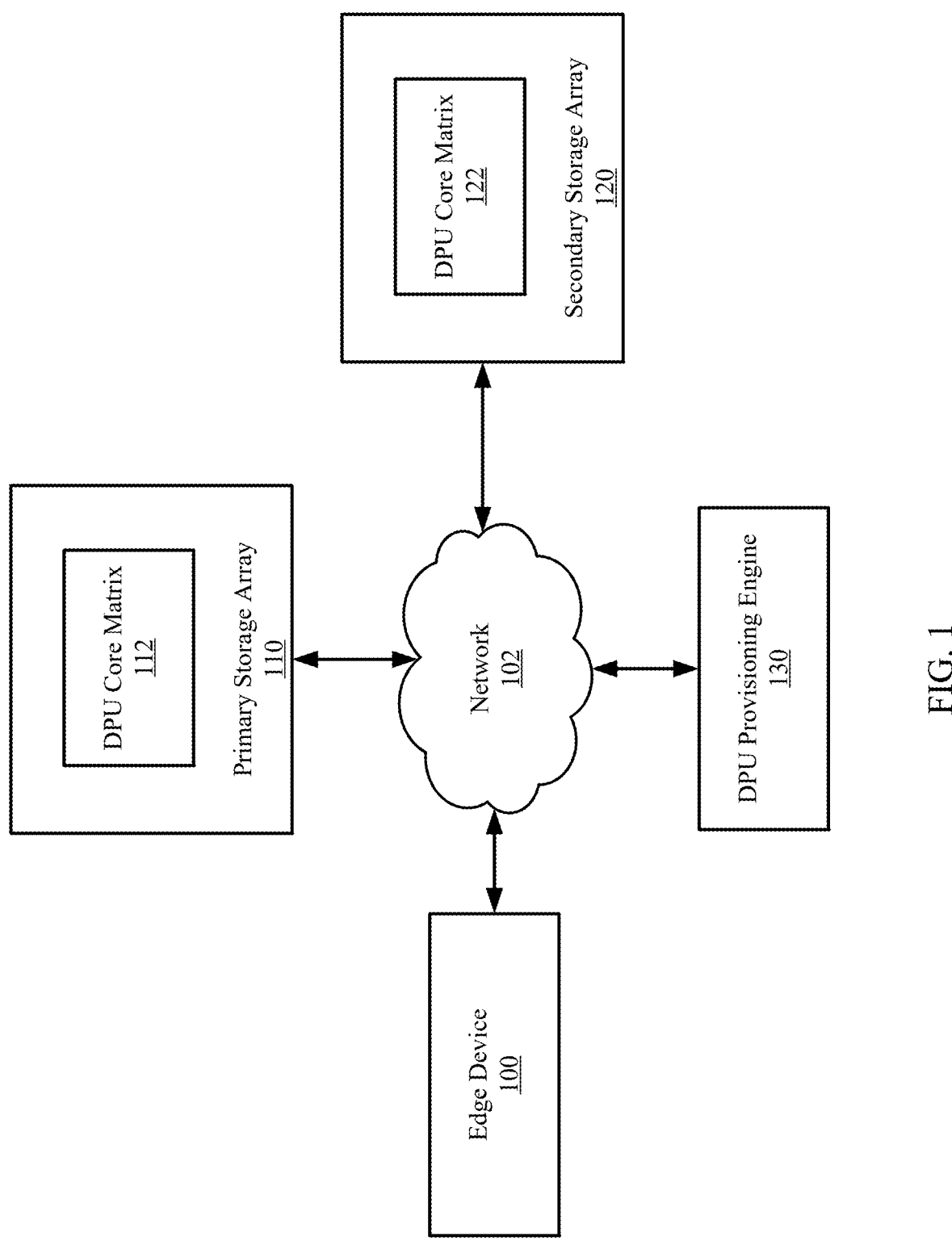
FIG. 1 shows a diagram of a system in accordance with one or more embodiments.

FIG. 1 shows a system in accordance with one or more embodiments. The system may include an edge device (100), a network (102), a primary storage array (110), a primary data processing unit (DPU) core matrix (112), a secondary storage array (120), a secondary DPU core matrix (122), and a DPU provisioning engine (130). The system may include additional, fewer, and/or different components without departing from the scope of the embodiments disclosed herein. Each component may be operably/operatively connected to any of the other components via any combination of wired and/or wireless connections. Each of these system components is described below.

In one or more embodiments, the edge device (100), the primary storage array (110), the primary DPU core matrix (112), the secondary storage array (120), the secondary DPU core matrix (122), and the DPU provisioning engine (130) may be operatively connected to one another through the network (102) (e.g., a local area network (LAN), a wide area network (WAN) such as the Internet, a mobile network, any other network type, or a combination thereof). Further, the network (102) may encompass various interconnected, network-enabled subcomponents (or systems) (e.g., switches, routers, gateways, etc.) that may facilitate communications between the aforementioned components. Moreover, the edge device (100), the primary storage array (110), the primary DPU core matrix (112), the secondary storage array (120), the secondary DPU core matrix (122), and the DPU provisioning engine (130) may communicate with one another using any combination of wired and/or wireless communication protocols.

In one or more embodiments, the edge device (100) may be a physical device such as a personal computing system (e.g., a laptop, a cell phone, a tablet computer, a server, etc.) configured for hosting one or more workloads, or for providing a computing environment whereon workloads may be implemented. For example, the edge device (100) may be a computing system (e.g., 500, FIG. 5) as discussed below in more detail in FIG. 5. In one or more embodiments, the edge device (100) may include a user interface (e.g., a graphical user interface) (not shown) that allows a user to interact with applications running on the edge device (100).

In one or more embodiments, the edge device (100) may include any number of applications (and/or content accessible through the applications) that provide computer-implemented services to a user. Applications may be designed and configured to perform one or more functions instantiated by a user of the edge device (100). In order to provide application services, each application may host similar or different components. The components may be, for example (but not limited to), instances of databases, instances of email servers, etc. Applications may be executed on one or more edge device(s) (100) as instances of the application.

Applications may vary in different embodiments, but in certain embodiments, applications may be custom-developed or commercial (e.g., off-the-shelf) applications that a user desires to execute on the edge device (100). In one or more embodiments, applications may be logical entities executed using computing resources of the edge device (100). For example, applications may be implemented as computer instructions stored on persistent storage of the edge device (100) that when executed by the processor(s) of the edge device (100), cause the edge device (100) to provide the functionality of the applications described throughout the application.

In one or more embodiments, while performing, for example, one or more operations requested by a user, applications installed on the edge device (100) may include functionality to request and use physical and logical resources of the edge device (100). Applications may also include functionality to use data stored in storage/memory resources of the edge device (100). The applications may perform other types of functionalities not listed above without departing from the scope of the embodiments disclosed herein. While providing application services to a user, applications may store data that may be relevant to the user in storage/memory resources of the edge device (100).

In one or more embodiments, to provide services to the users, the edge device (100) may utilize, rely on, or otherwise cooperate with an infrastructure node (IN) (not shown). For example, the edge devices (100) may issue requests to the IN to receive responses and interact with various components of the IN. The edge device (100) may also request data from and/or send data to the IN (for example, the edge devices (100) may transmit information to the IN that allows the IN to perform computations, the results of which are used by the edge device (100) to provide services to the users). As yet another example, the edge device (100) may utilize computer-implemented services provided by the IN. When the edge devices (100) interact with the IN, data that is relevant to the edge device (100) may be stored (temporarily or permanently) in the IN.

In one or more embodiments, the edge device (100) may be capable of, for example: (i) collecting users' inputs, (ii) correlating collected users' inputs to the computer-implemented services to be provided to the users, (iii) communicating with IN that perform computations necessary to provide the computer-implemented services, (iv) using the computations performed by the infrastructure nodes to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the edge devices (100) may provide computer-implemented services to users (and/or other computing devices). The edge devices (100) may provide any number and any type of computer-implemented services. To provide computer-implemented services, an edge device (100) may include a collection of physical components (e.g., processing resources, storage/memory resources, networking resources, etc.) configured to perform operations of the edge device (100) and/or otherwise execute a collection of logical components (e.g., virtualization resources) of the edge device (100).

Figure 2:
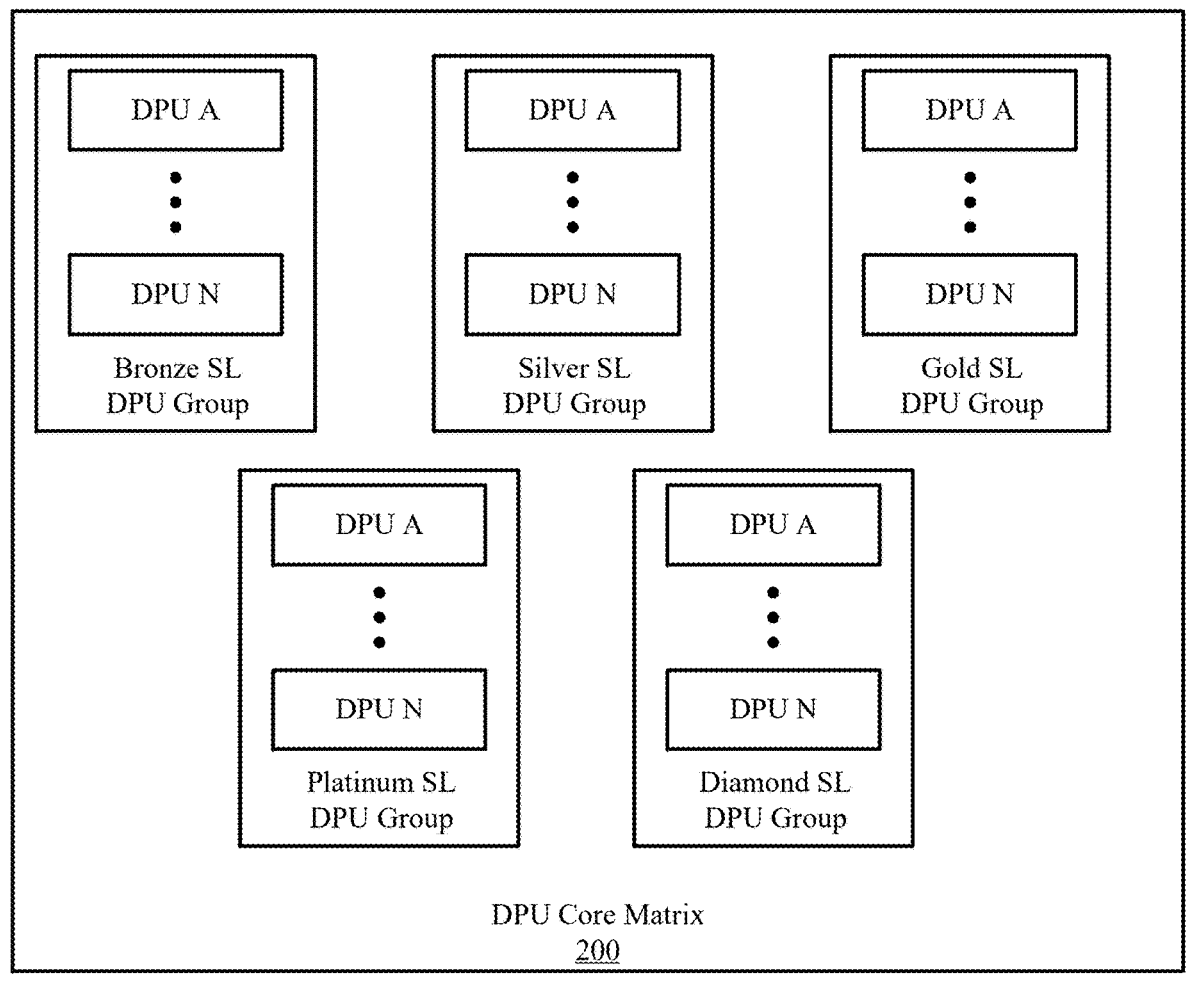
FIG. 2 shows a diagram of a DPU core matrix in accordance with one or more embodiments.
Figure 3:
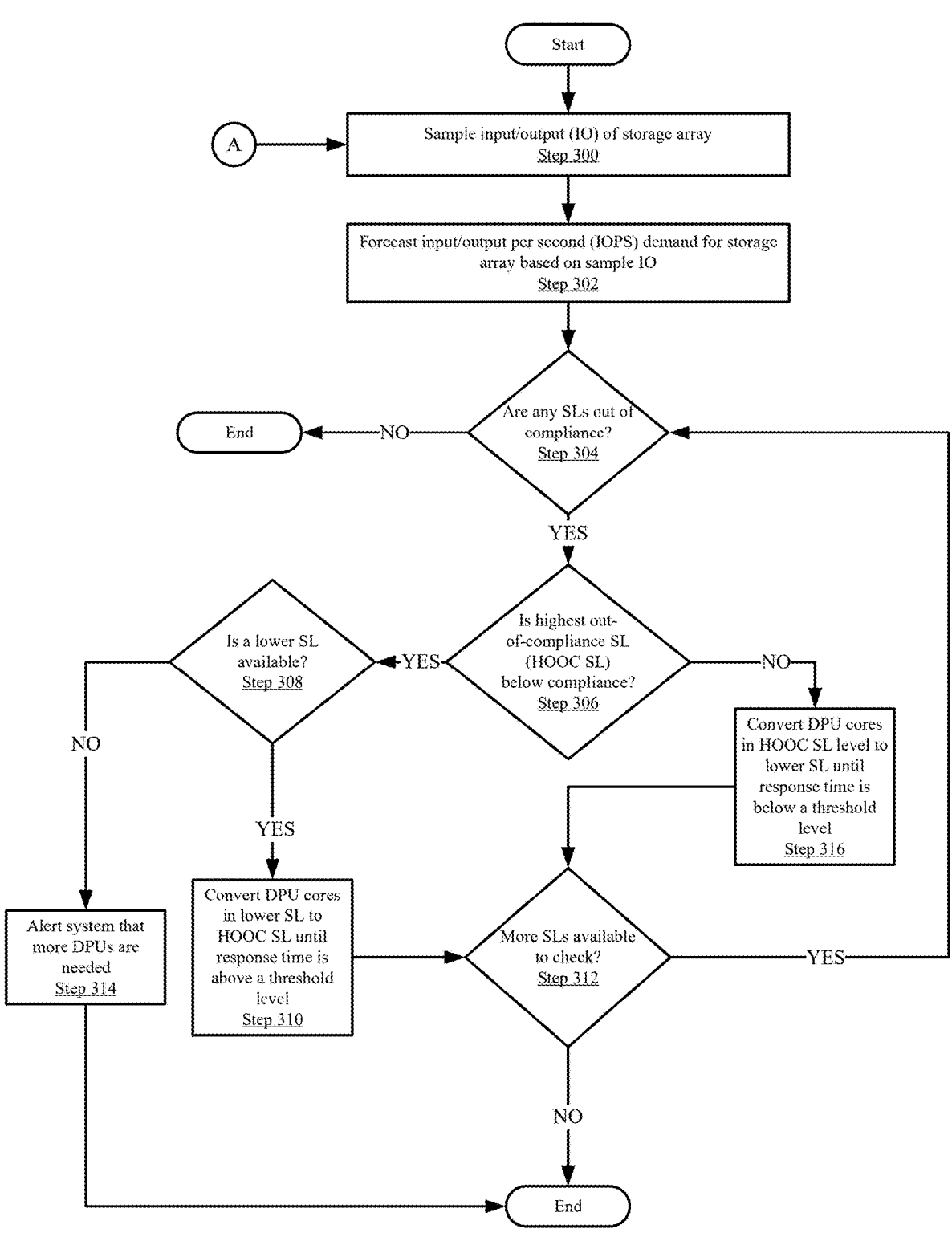
FIG. 3 shows a flowchart of a method for adjusting DPU utilization of a storage array in accordance with one or more embodiments.

Further, the edge device (100) may include functionality to perform at least a portion of the methods shown in FIGS. 2-4. One of ordinary skill in the art will appreciate that the edge device (100) may perform other functionalities without departing from the scope of the embodiment disclosed herein.

In one or more embodiments, the primary storage array (110) is a system that aggregates multiple storage devices to provide a unified and shared storage solution for various applications (e.g., databases, virtual machines (VMs), file servers, etc.). In one or more embodiments, storage devices include but are not limited to volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF)

device, resistive RAM (ReRAM), persistent memory (PMEM), virtualized storage, and virtualized memory. In one or more embodiments, the primary storage array (110) leverages the primary DPU core matrix (112) to offload data intensive requests such as to host IO requests (e.g., reading and/or writing data from the primary storage array (110)), background IO requests (e.g., encryption, compression, deduplication, etc.), low-priority (LP) requests (e.g., system maintenance, system diagnostics, etc.), replication IO requests (e.g., copying and transferring data between storage arrays), etc. In one or more embodiments, the primary storage array (110) includes the functionality to send data to other components inside or outside of the system using the network (102). Further, the primary storage array (110) includes functionality to perform at least a portion of the method shown in FIGS. 3-4. One of ordinary skill will appreciate that the primary storage array (110) may perform other functionalities without departing from the scope of the application.

In one or more embodiments, the primary DPU core matrix (112) includes the functionality to perform processing tasks, such as offloading requests from a system's processing resources, such as a central processing unit (CPU), graphics processing unit (GPU), or other processing units (not shown), or from processing resources of other components. It should be appreciated, that by offloading data-intensive requests, the primary DPU core matrix (112) enables more efficient and optimized performance of the system. In one or more embodiments, the primary DPU core matrix (112) includes DPUs A-N each capable of performing processing tasks, as shown below in FIG. 2. In one or more embodiments, the primary DPU core matrix (112) includes various service levels (SLs) that DPUs of the primary DPU core matrix (112) operate at, where each SL is defined based on the characteristics (e.g., input-output per second (IOPS), response time, clock speed, power consumption, etc.) of the DPUs operating each respective SL, as shown in FIG. 2. In one or more embodiments, the SLs are ranked in ascending order: Bronze, Silver, Gold, Platinum, and Diamond, where Bronze is the lowest SL and Diamond is the highest SL. In one or more embodiments, a higher SL is associated with a higher utilization of a DPU. In one or more embodiments, the DPUs of the primary DPU core matrix (112) can be moved to different SLs depending on the needs of the primary storage array (110). Further, the primary DPU core matrix (112) includes functionality to perform at least a portion of the method shown in FIGS. 3-4. One of ordinary skill will appreciate that the primary DPU core matrix (112) may perform other functionalities without departing from the scope of the application.

In one or more embodiments, the secondary storage array (120) is a system that aggregates multiple storage devices to provide a unified and shared storage solution for various applications. In one or more embodiments, storage devices include but are not limited to volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the secondary storage array (120) leverages a secondary DPU core matrix (122) to offload data intensive requests. In one or more embodiments, the secondary storage array (120) includes the functionality to send data to other components inside or outside of the system using the network (102). In one or more embodiments, the primary storage array (110) offloads requests to the secondary storage array (120). Further, the secondary storage array (120) includes functionality to perform at least a portion of the method shown in FIGS. 3-4. One of ordinary skill will appreciate that the secondary storage array (120) may perform other functionalities without departing from the scope of the application.

In one or more embodiments, the secondary DPU core matrix (122) includes the functionality to perform processing tasks, such as offloading requests from a system's processing resources, such as a central processing unit (CPU), graphics processing unit (GPU), or other processing units (not shown), or from processing resources of other components. It should be appreciated, that by offloading data-intensive requests, the secondary DPU core matrix (122) enables more efficient and optimized performance of the system. In one or more embodiments, the secondary DPU core matrix (122) includes DPUs A-N each capable of performing processing tasks, as shown below in FIG. 2. In one or more embodiments, the secondary DPU core matrix (122) includes various service levels (SLs) that DPUs of the secondary DPU core matrix (122) operate at, where each SL is defined based on the characteristics (e.g., IOPS, response time, clock speed, power consumption, etc.) of the DPUs operating each respective SL, as shown in FIG. 2. In one or more embodiments, the SLs are ranked in ascending order: Bronze, Silver, Gold, Platinum, and Diamond, where Bronze is the lowest SL and Diamond is the highest SL. In one or more embodiments, a higher SL is associated with a high utilization of a DPU. In one or more embodiments, the DPUs of the secondary DPU core matrix (122) can be moved from different service levels depending on the needs of the secondary storage array (120). Further, the secondary DPU core matrix (122) includes functionality to perform at least a portion of the method shown in FIGS. 3-4. One of ordinary skill will appreciate that the secondary DPU core matrix (122) may perform other functionalities without departing from the scope of the application.

In one or more embodiments, the DPU provisioning engine (130) includes the functionality to sample the input/output (IO) of requests (e.g., requests including reading and writing data, data encryption, data compression, etc.) sent to the primary storage array (110) and secondary storage array (120). In one or more embodiments, the sampling involves capturing and analyzing requests received by the primary storage array (110) and/or secondary storage array (120). In one or more embodiments, the sampling provides the DPU provisioning engine (130) with data about the requests including but not limited to, the volume of the requests received, the complexity of each of the requests, the frequency at which the requests are received, the specific times during which the requests are received, etc. In one or more embodiments, the DPU provisioning engine (130) includes the functionality to forecast the IOPS demand and response time (i.e., the time it takes for a storage array to complete a request) required for storage arrays (e.g., the primary storage array (110), secondary storage array (120), etc.) using the sampling. In one or more embodiments, the DPU provisioning engine (130) may utilize any machine learning algorithms known in the art or discovered in the future when forecasting. In one or more embodiments, the DPU provisioning engine (130) includes the functionality to move DPUs to higher and lower SLs in DPU core matrices (e.g., the primary DPU core matrix (112) and/or the secondary DPU core matrix (122)). Further, the DPU provisioning engine (130) includes functionality to perform at least a portion of the method shown in FIGS. 3-4. One of ordinary skill will appreciate that the DPU provisioning engine (130) may perform other functionalities without departing from the scope of the application.

Figure 5:
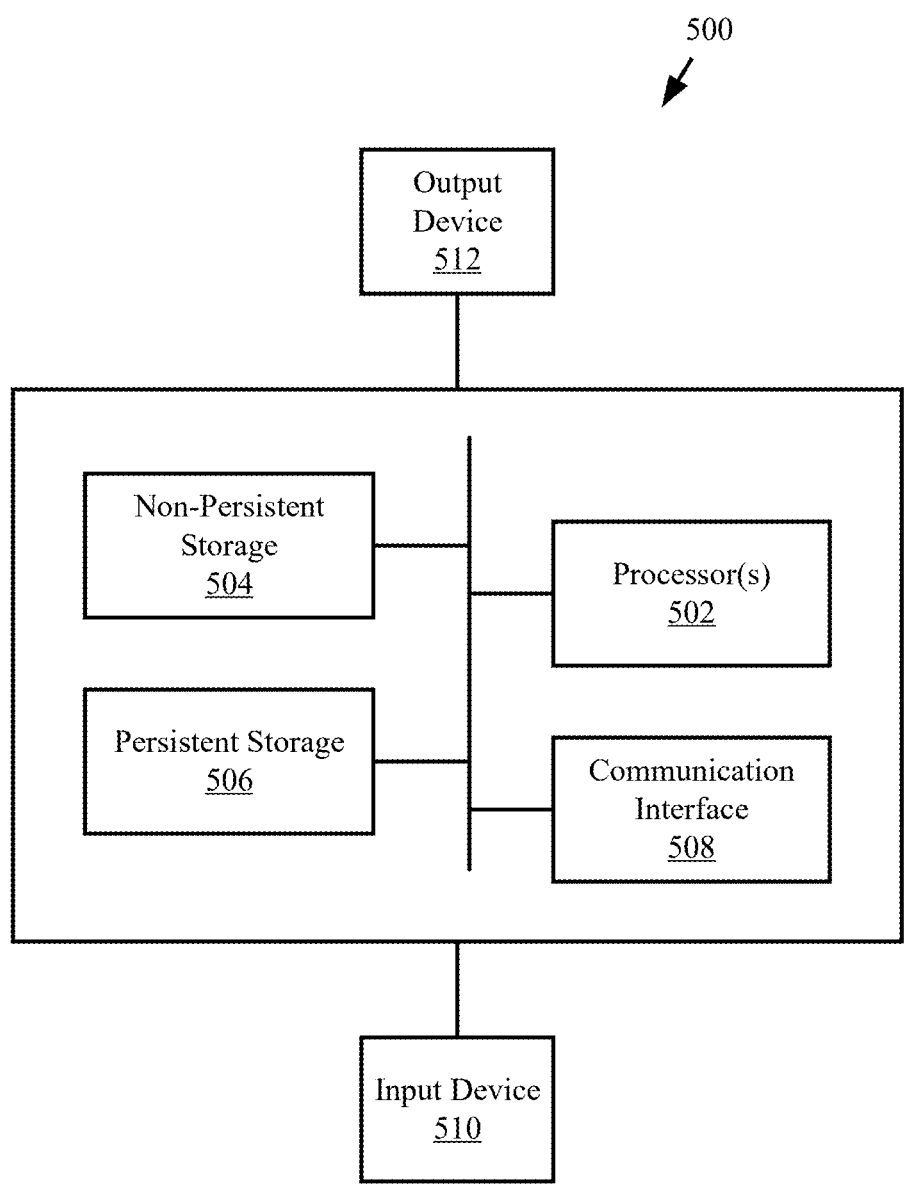
FIG. 5 shows a diagram of a computing system in accordance with one or more embodiments.

In one or more embodiments, the edge device (100), the primary storage array (110), the primary DPU core matrix (112), the secondary storage array (120), the secondary DPU core matrix (122), and the DPU provisioning engine (130) are each implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the edge device (100), the primary storage array (110), the primary DPU core matrix (112), the secondary storage array (120), the secondary DPU core matrix (122), and the DPU provisioning engine (130) described throughout this application.

In one or more embodiments, the edge device (100), the primary storage array (110), the primary DPU core matrix (112), the secondary storage array (120), the secondary DPU core matrix (122), and the DPU provisioning engine (130) are each implemented as a logical device. The logical device may utilize the computing resources of any number of computing devices and thereby provide the functionality of the edge device (100), the primary storage array (110), the primary DPU core matrix (112), the secondary storage array (120), the secondary DPU core matrix (122), and the DPU provisioning engine (130).

Turning to FIG. 2, FIG. 2 shows a diagram of a DPU core matrix (200) in accordance with one or more embodiments. In one or more embodiments, the DPU core matrix (200) includes the functionality to perform processing requests. In one or more embodiments, the DPU core matrix (200) includes DPUs/cores A-N each capable of offloading data-intensive requests from the system's CPU. In one or more embodiments, the DPU core matrix (200) includes various SLs that DPUs of the DPU core matrix (200) operate at, where each SL is defined based on the characteristics (e.g., input-output per second (IOPS), response time, clock speed, power consumption, etc.) of the DPUs operating each respective SL. In one or more embodiments, the SLs are ranked in ascending order: Bronze, Silver, Gold, Platinum, and Diamond, where Bronze is the lowest SL and Diamond is the highest SL. It should be appreciated, that the DPU core matrix (200) may have more or fewer SLs. In one or more embodiments, a higher SL is associated with a high utilization of a DPU. In one or more embodiments, the DPUs of the DPU core matrix (200) can be moved to different SLs depending on the needs of the storage arrays (e.g., the primary storage array (e.g., 110 in FIG. 1) or the secondary storage array (e.g., 120 in FIG. 1)). Further, the DPU core matrix (200) includes functionality to perform at least a portion of the method shown in FIGS. 3-4. One of ordinary skill will appreciate that the DPU core matrix (200) may perform other functionalities without departing from the scope of the application.

Turning to FIG. 3, FIG. 3 shows a flowchart of a method for adjusting data processing unit (DPU) utilization of a storage array in accordance with one or more embodiments disclosed herein. The method may be performed by, for example, a DPU provisioning engine (e.g., 130 in FIG. 1). Other components in the system may perform this method without departing from the scope of the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 300, the DPU provisioning engine (e.g., 130 in FIG. 1) samples the input/output (IO) of requests ("sampling") received by a primary storage array (e.g., 110 in FIG. 1). In one or more embodiments, the sampling involves capturing and analyzing requests received by the primary storage array (e.g., 110 in FIG. 1). In one or more embodiments, requests may include but are not limited to operations such as reading and writing data, data compression, data encryption, etc. In one or more embodiments, the sampling provides the DPU provisioning engine (e.g., 130 in FIG. 1) with data about the requests including but not limited to, the volume of the requests received, the complexity of each of the requests, the frequency at which the requests are received, the specific times during which the requests are received, etc. In one or more embodiments, the sampling may include an analysis of how the primary storage array (e.g., 110 in FIG. 1) is processing the requests including but not limited to factors such as response times and DPU utilizations (i.e., how many DPUs of a primary DPU core matrix (e.g., 112 in FIG. 1) are being utilized to complete the requests and the clock speed at which they are running). In one or more embodiments, the clock speed refers to the amount of time it takes for a DPU to complete a task where each request in comprises of multiple tasks. Clock speed is often measured in cycles per second (Hertz). In one or more embodiments, the sampling allows the DPU provisioning engine (e.g., 130 in FIG. 1) to establish a detailed record of the workload being handled by the primary storage array (e.g., 110 in FIG. 1). In one or more embodiments, the DPU provisioning engine (e.g., 130 in FIG. 1) may use any machine learning algorithms known in the art or discovered in the future when sampling. In one or more embodiments, the DPU provisioning engine (e.g., 130 in FIG. 1) is continually sampling to provide itself with the most up to date data. It should be appreciated, that the DPU provisioning engine (e.g., 130 in FIG. 1) may conduct the sampling by any means known in the art or discovered in the future.

In step 302, the DPU provisioning engine (e.g., 130 in FIG. 1) forecasts the input-output per second (IOPS) demand and response time (i.e., the time it takes for a storage array to complete a request) required for the primary storage array (e.g., 110 in FIG. 1) based upon the sampling. In one or more embodiments, IOPS refers to the total number of read and write operations that the primary storage array (e.g., 110 in FIG. 1) can process per second. In one or more embodiments, read operations retrieve data from the primary storage array (e.g., 110 in FIG. 1) while write operations save or update data in the primary storage array (e.g., 110 in FIG. 1). In one or more embodiments, by analyzing the volume, complexity and timing requests from the sampling, the DPU provisioning engine (e.g., 130 in FIG. 1) can forecast IOPS and response time needed to handle the incoming requests. In a non-limiting example, the sampling may indicate an incoming heavy workload based on recent activity patterns or specific times a day when user login or system access spikes are expected, allowing the DPU provisioning engine (e.g., 130 in FIG. 1) to anticipate increased demand. Conversely, the sampling may reveal periods of low activity, allowing the DPU provisioning engine (e.g., 130 in FIG. 1) to anticipate reduced demand. In one or more embodiments, the DPU provisioning engine (e.g., 130 in FIG. 1) utilizes machine learning to forecast the IOPS demand for and response time required of the primary storage array (e.g., 110 in FIG. 1) to complete the request. In one or more embodiments, the DPU provisioning engine (e.g., 130 in FIG. 1) may use any machine learning algorithms known in the art or discovered in the future when forecasting.

In one or more embodiments, the primary storage array (e.g., 110 in FIG. 1) utilizes a primary DPU core matrix (e.g., 112 in FIG. 1) to handle the requests. In one or more embodiments, the primary DPU core matrix (e.g., 112 in FIG. 1) includes various service levels (SLs) that DPUs of the primary DPU core matrix (112) operate at, where each SL is defined based on the characteristics (e.g., IOPS, response time, clock speed, power consumption, etc.) of the DPUs operating each respective SL, as shown in FIG. 2. In one or more embodiments, the DPUs at each SL share the same characteristics. In one or more embodiments, the SLs are ranked in ascending order: Bronze, Silver, Gold, Platinum, and Diamond, where Bronze is the lowest SL and Diamond is the highest SL. In one or more embodiments, there may be more or less SLs that the DPUs operate at within the DPU core matrix (e.g., 112 in FIG. 1). In one or more embodiments, a higher SL is associated with a higher utilization of a DPU (e.g., higher IOPS, higher response time, clock speed, etc.). In one or more embodiments, there are a discrete amount of DPUs operating at each SL. In one or more embodiments, DPUs operating characteristics can be changed to move them between different service levels. In one or more embodiments, the forecast may anticipate a variety of requests with varying DPU utilization requirements (e.g., response time). In one or more embodiments, each request may be delegated to DPUs at a specific SL depending on the DPU utilization requirements corresponding to the request. It should be appreciated, that assigning requests to different SLs improves power saving of a system because instead of using DPUs at the highest SL which are using more power, requests that require less DPU utilization can be handled by DPUs operating at lower service levels which consume less power.

In step 304, the DPU provisioning engine (e.g., 130 in FIG. 1) determines whether any SLs of the primary DPU core matrix (e.g., 112 in FIG. 1) are out of compliance based on the forecast. In one or more embodiments, the DPU provisioning engine (e.g., 130 in FIG. 1) makes this determination by determining whether the DPUs at each SL are sufficient to handle the requests received by the primary storage array (e.g., 110 in FIG. 1). In one or more embodiments, if the requests collectedly require more DPUs than are available at a particular SL causing a decline in response time due to the bottlenecking of requests, then that SL is out of compliance. Conversely, if there is a minimal amount of request being handled by a particular SL resulting in a response time that is above a predetermined threshold, then that particular SL is out of compliance. It should be appreciated, that the SL is out of compliance when the response time is above a threshold because the system is configured to conserve power thus if the response time that is above the threshold that means that DPS of the SL are being under-utilized resulting in wasted power. In one or more embodiments, the predetermined threshold may be determined by any means known in the art or discovered in the future. In one or more embodiments, the DPU provisioning engine (e.g., 130 in FIG. 1) may determine whether any SLs are out of compliance by any means known in the art or discovered in the future. Accordingly, if the result is YES, the method proceeds to step 306. If the result is NO, the method ends.

In step 306, the DPU provisioning engine (e.g., 130 in FIG. 1) determines whether the highest out of compliance SL (HOOC SL) of the secondary DPU core matrix (e.g., 122 in FIG. 1) is below compliance. In one or more embodiments, if the requests collectedly require more DPUs than are available at a particular SL resulting in a drop in the response time below a predetermined threshold, then the HOOC SL is below compliance. Conversely, if there is a minimal amount of requests being handled by the HOOC SL resulting in a response time above a predetermined threshold, then that particular HOOC SL is above compliance. In one or more embodiments, the DPU provisioning engine (e.g., 130 in FIG. 1) may make this determination by any means known in the art or discovered in the future. It should be appreciated, that if it is determined that the HOOC SL is not below compliance, then it is above compliance. Accordingly of the result is YES then the method proceeds to step 308. If the result is NO then the method proceeds to step 316.

As a result of the determination that the HOOC SL is below compliance in step 306, the method arrives at step 308. In step 308, the DPU provisioning engine (e.g., 130 in FIG. 1) determines whether there is an SL available in the in the primary DPU core matrix (e.g., 112 in FIG. 1) that is lower than the HOOC SL (i.e., whether the HOOC SL is the lowest SL in the primary DPU core matrix (e.g., 112 in FIG. 1)). In a non-limiting example, in the primary DPU core matrix (e.g., 112 in FIG. 1) with SLs ranked in ascending order: Bronze, Silver, Gold, Platinum, and Diamond, where Bronze is the lowest SL and Diamond is the highest SL, if the HOOC SL was Gold, then the lower SLs would be Silver and Bronze thus the result would be YES. Conversely, if the HOOC SL is Bronze, then there are no lower SLs thus the result would be NO. In one or more embodiments, the DPU provisioning engine (e.g., 130 in FIG. 1) may make this determination by any means known in the art or discovered in the future. Accordingly, if the result is YES, then the method proceeds to step 310. If the result is NO, then the method proceeds to step 314.

As a result, of the determination that there is an SL that is lower than the HOOC SL available in the in the primary DPU core matrix (e.g., 112 in FIG. 1) in step 308, the method arrives at step 310. In step 310, the DPU provisioning engine (e.g., 130 in FIG. 1) instructs the primary DPU core matrix (e.g., 112 in FIG. 1) to move DPUs in SLs lower than the HOOC SL to the same SL as the HOOC SL until the IOPS and response time of the HOOC SL are above a predetermined threshold (i.e., back in compliance). In one or more embodiments, the predetermined threshold may be determined by any means known in the art including but not limited to, specifications sent by the entity (e.g., host IOs, backup IOs, etc.) sending the requests to the primary storage array (e.g., 110 in FIG. 1), manufacture specifications, company policies, machine learning algorithms, etc. In one or more embodiments, moving a DPU to higher or lower SL refers to increasing or decreasing the clock speed of the DPUs respectively to match the clock speed of DPUs operating in higher or lower SLs. In one or more embodiments, the DPU provisioning engine (e.g., 130 in FIG. 1) prioritizes moving DPUs that are lower but closer in rank to the HOOC SL rather than moving SLs from the lowest SL to conserve power. Continuing with the non-limiting example in step 308, if the HOOC SL is Gold, the system may move DPUs from Silver to Gold before moving DPUs from Bronze to Gold. In one or more embodiments, following step 310 the method proceeds to step 312.

As a result, of the determination that there is not an SL that is lower than the HOOC SL available in the in the primary DPU core matrix (e.g., 112 in FIG. 1) in step 308, the method arrives at step 314. In step 314, the DPU provisioning engine (e.g., 130 in FIG. 1) alerts the system that more DPUs are needed in the primary DPU core matrix (e.g., 112 in FIG. 1) to handle the requests received by the primary storage array (e.g., 110 in FIG. 1). In one or more embodiments, the DPU provisioning engine (e.g., 130 in FIG. 1) may alert a user via a graphical user interface (GUI) on an edge device (e.g., 100 in FIG. 1).

In one or more embodiments, the method may end following step 314.

As a result of the determination that the HOOC SL is not below compliance in step 306, the method arrives at step 316. It should be appreciated, that the HOOC SL is above compliance in step 316 because it was determined that it was not below compliance in step 306. In step 316, the DPU provisioning engine (e.g., 130 in FIG. 1) instructs the primary DPU core matrix (e.g., 112 in FIG. 1) to move DPUs in the HOOC SL to lower SLs of the primary DPU core matrix (e.g., 112 in FIG. 1) until the response time of the HOOC SL is below a predetermined threshold. In one or more embodiments, the DPU provisioning engine (e.g., 130 in FIG. 1) is configured to prioritize power savings by moving DPUs in the HOOC SL to the lowest SL in the primary DPU core matrix (e.g., 112 in FIG. 1). It should be appreciated, that the HOOC SL being above compliance is an indicator of underutilization of the DPUs due to insufficient workload. It should be further appreciated, that in such scenarios, moving DPUs to lower SL can reduce power consumption. In one or more embodiments, the predetermined threshold may be determined by any means known in the art including but not limited to, specifications sent by the entity (e.g., host IOs, backup IOs, etc.) sending the requests to the primary storage array (e.g., 110 in FIG. 1), manufacture specifications, company policies, machine learning algorithms, etc. In one or more embodiments, moving a DPU to higher or lower SL refers to increasing or decreasing the clock speed of the DPUs respectively to match the clock speed of DPUs operating in higher or lower SLs. In one or more embodiments, the method proceeds to step 312.

In one or more embodiments, the method may arrive at step 312 from step 310 or 316. In step 316, the DPU provisioning engine (e.g., 130 in FIG. 1) determines whether there are any more SL of the primary DPU core matrix (e.g., 112 in FIG. 1) to check for compliance. In one or more embodiments, unless the HOOC SL was the lowest SL, there are more SLs to check for compliance. In a non-limiting example, if the HOOC SL was Gold, then the DPU provisioning engine (e.g., 130 in FIG. 1) still needs to check the compliance of the Silver and Bronze SLs. In one or more embodiments, the moving of the DPUs to higher and lower SLs may have an impact on the compliance of the other SL in the primary DPU core matrix (e.g., 112 in FIG. 1). In one or more embodiments, the DPU provisioning engine (e.g., 130 in FIG. 1) may make this determination by any means known in the art or discovered in the future. Accordingly, if the result is YES, then the method proceeds to step 304. If the result is NO, then the method ends. In one or more embodiments, the method proceeds to step 304 until the result is NO.

In one or more embodiments, the method may end following step 312.

Turning to FIG. 4.1, FIG. 4.1 shows a flowchart of a method for forecasting demand for a primary storage array (e.g., 110 in FIG. 1) and a secondary storage array (e.g., 120 in FIG. 1) in accordance with one or more embodiments disclosed herein. The method may be performed by, for example, a DPU provisioning engine (e.g., 130 in FIG. 1). Other components in the system may perform this method without departing from the scope of the disclosure.

While the various steps in the flowchart shown in FIG. 4.1 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 400, the DPU provisioning engine (e.g., 130 in FIG. 1) determines whether the array that it is analyzing is the primary storage array (e.g., 110 in FIG. 1). It should be appreciated, that if the result is NO, then the DPU provisioning engine (e.g., 130 in FIG. 1) is analyzing an alternative storage array. In one or more embodiments, the alternative storage array is the secondary storage array (e.g., 120 in FIG. 1). In one or more embodiments, the DPU provisioning engine (e.g., 130 in FIG. 1) may make this determination by any means known in the art or discovered in the future. Accordingly, if the result is Yes then the method proceeds to step 300 in FIG. 3. If the result is NO, then the method proceeds to step 402.

In step 402, the DPU provisioning engine (e.g., 130 in FIG. 1) samples the input/output (IO) of requests ("sampling") received by a primary storage array (e.g., 110 in FIG. 1) and a secondary storage array (e.g., 120 in FIG. 1). In one or more embodiments, the primary storage array (e.g., 110 in FIG. 1) handles its own requests, while the secondary storage array (e.g., 120 in FIG. 1) handles its own a separate set of requests. In one or more embodiments, the secondary storage array (e.g., 120 in FIG. 1) may receive additional requests from the primary storage array (e.g., 110 in FIG. 1). In one or more embodiments, the secondary storage array (e.g., 120 in FIG. 1) is a remote storage array connected to the primary storage array (e.g., 110 in FIG. 1) via a network (e.g., 102 in FIG. 1). In one or more embodiments, the sampling involves capturing and analyzing requests received by the primary storage array (e.g., 110 in FIG. 1) and secondary storage array (e.g., 120 in FIG. 1). In one or more embodiments, requests may include but are not limited to operations such as reading and writing data, data compression, data encryption, etc. In one or more embodiments, the sampling provides the DPU provisioning engine (e.g., 130 in FIG. 1) with data about the requests including but not limited to, the volume of the requests received, the complexity of each of the requests, the frequency at which the requests are received, the specific times during which the requests are received, etc. In one or more embodiments, the sampling may include an analysis of how the primary storage array (e.g., 110 in FIG. 1) and secondary storage array (e.g., 120 in FIG. 1) processes the requests including but not limited to factors such as response times and DPU utilizations (i.e., how many DPUs of a primary DPU core matrix (e.g., 112 in FIG. 1) of the primary storage array (e.g., 110 in FIG. 1) and how many DPUs of a secondary DPU core matrix (e.g., 122 in FIG. 1) of the secondary storage array (e.g., 120 in FIG. 1) are being utilized to complete the requests and the clock speed they are running at). In one or more embodiments, the clock speed refers to the amount of time it takes for a DPU to complete a task where each request in comprises of multiple tasks. Clock speed is often measured in cycles per second (hertz). In one or more embodiments, the sampling allows the DPU provisioning engine (e.g., 130 in FIG. 1) to establish a detailed record of the workload being handled by the primary storage array (e.g., 110 in FIG. 1) and a detailed record of the workload being handled by the secondary storage array (e.g., 120 in FIG. 1). In one or more embodiments, the DPU provisioning engine (e.g., 130 in FIG. 1) may use any machine learning algorithms known in the art or discovered in the future when sampling. In one or more embodiments, the DPU provisioning engine (e.g., 130 in FIG. 1) is continuously sampling to provide itself with the most up to date data. It should be appreciated, that the DPU provisioning engine (e.g., 130 in FIG. 1) may conduct the sampling by any means known in the art or discovered in the future.

In step 404, the DPU provisioning engine (e.g., 130 in FIG. 1) forecasts the input-output per second (IOPS) demand and response time (i.e., the time it takes for a storage array to complete a request) required for the primary storage array (e.g., 110 in FIG. 1) based upon the sampling of the primary storage array (e.g., 110 in FIG. 1). In one or more embodiments, IOPS refers to the total number of read and write operations that the primary storage array (e.g., 110 in FIG. 1) can process per second. In one or more embodiments, read operations retrieve data from the primary storage array (e.g., 110 in FIG. 1) while write operations save or update data in the primary storage array (e.g., 110 in FIG. 1). In one or more embodiments, by analyzing the volume, complexity and timing requests from the sampling, the DPU provisioning engine (e.g., 130 in FIG. 1) can forecast IOPS and response time needed to handle the incoming requests. In a non-limiting example, the sampling may indicate an incoming heavy workload based on recent activity patterns or specific times a day when user login or system access spikes are expected, allowing the DPU provisioning engine (e.g., 130 in FIG. 1) to anticipate increased demand. Conversely, the sampling may reveal periods of low activity, allowing the DPU provisioning engine (e.g., 130 in FIG. 1) to anticipate reduced demand. In one or more embodiments, the DPU provisioning engine (e.g., 130 in FIG. 1) utilizes machine learning to forecast the IOPS demand for and response time required of the primary storage array (e.g., 110 in FIG. 1) to complete the request. In one or more embodiments, the DPU provisioning engine (e.g., 130 in FIG. 1) may use any machine learning algorithms known in the art or discovered in the future when forecasting. In one or more embodiments, the forecasting of the primary storage array (e.g., 110 in FIG. 1) is ignorant of the sampling of the secondary storage array (e.g., 120 in FIG. 1).

In one or more embodiments, the primary storage array (e.g., 110 in FIG. 1) utilizes a primary DPU core matrix (e.g., 112 in FIG. 1) to handle the requests. In one or more embodiments, the primary DPU core matrix (e.g., 112 in FIG. 1) includes various service levels (SLs) that DPUs of the primary DPU core matrix (e.g., 112 in FIG. 1) operate at, where each SL is defined based on the characteristics (e.g., IOPS, response time, clock speed, power consumption, etc.) of the DPUs operating each respective SL, as shown in FIG. 2. In one or more embodiments, the DPUs at each SL share the same characteristics. In one or more embodiments, the SLs are ranked in ascending order: Bronze, Silver, Gold, Platinum, and Diamond, where Bronze is the lowest SL and Diamond is the highest SL. In one or more embodiments, there may be more or less SLs that the DPUs operate at within the DPU core matrix (e.g., 112 in FIG. 1). In one or more embodiments, a higher SL is associated with a high utilization of a DPU (e.g., higher IOPS, higher response time, clock speed, etc.). In one or more embodiments, there are a definite amount of DPUs operating at each SL. In one or more embodiments, DPUs' operating characteristics can be changed to move them between different service levels. In one or more embodiments, the forecast may anticipate a variety of requests with varying DPU utilization requirements (e.g., response time). In one or more embodiments, each request may maybe be delegated to DPUs at a specific SL depending on the DPU utilization requirements corresponding to the request. It should be appreciated, that assigning requests to different SLs improves power saving of a system because instead of using DPUs at the highest SL which use a lot of power, requests that require less DPU utilization can be handled by DPUs operating at lower service levels which consume less power.

In step 406, the DPU provisioning engine (e.g., 130 in FIG. 1) forecasts the IOPS demand and response time required for the secondary storage array (e.g., 120 in FIG. 1) based upon the sampling of the secondary storage array (e.g., 120 in FIG. 1). In one or more embodiments, by analyzing the volume, complexity, and timing requests from the sampling, the DPU provisioning engine (e.g., 130 in FIG. 1) can forecast IOPS and response time needed to handle the incoming requests. In a non-limiting example, the sampling may indicate an incoming heavy workload based on recent activity patterns or specific times a day when user login or system access spikes are expected, allowing the DPU provisioning engine (e.g., 130 in FIG. 1) to anticipate increased demand. Conversely, the sampling may reveal periods of low activity, allowing the DPU provisioning engine (e.g., 130 in FIG. 1) to anticipate reduced demand. In one or more embodiments, the DPU provisioning engine (e.g., 130 in FIG. 1) utilizes machine learning algorithms to forecast the IOPS demand for and response time required of the secondary storage array (e.g., 120 in FIG. 1) to complete the request. In one or more embodiments, the DPU provisioning engine (e.g., 130 in FIG. 1) may use any machine learning algorithms known in the art or discovered in the future when forecasting. In one or more embodiments, the forecasting of the secondary storage array (e.g., 120 in FIG. 1) is ignorant of the sampling of the primary storage array (e.g., 110 in FIG. 1).

In one or more embodiments, the secondary storage array (e.g., 120 in FIG. 1) utilizes a secondary DPU core matrix (e.g., 122 in FIG. 1) to handle the requests. In one or more embodiments, the secondary DPU core matrix (e.g., 122 in FIG. 1) includes various service levels (SLs) that DPUs of the secondary DPU core matrix (122) operate at, where each SL is defined based on the characteristics (e.g., IOPS, response time, clock speed, power consumption, etc.) of the DPUs operating each respective SL, as shown in FIG. 2. In one or more embodiments, the DPUs at each SL share the same characteristics. In one or more embodiments, the SLs are ranked in ascending order: Bronze, Silver, Gold, Platinum, and Diamond, where Bronze is the lowest SL and Diamond is the highest SL. In one or more embodiments, there may be more or less SLs that the DPUs operate at within the secondary DPU core matrix (e.g., 122 in FIG. 1). In one or more embodiments, a higher SL is associated with a high utilization of a DPU (e.g., higher IOPS, higher response time, clock speed, etc.). In one or more embodiments, there are a definite amount of DPUs operating at each SL. In one or more embodiments, DPUs' operating characteristics can be changed to move them between different service levels. In one or more embodiments, the forecast may anticipate a variety of requests with varying DPU utilization requirements (e.g., response time). In one or more embodiments, each request may maybe be delegated to DPUs at a specific SL depending on the DPU utilization requirements corresponding to the request. It should be appreciated, that assigning requests to different SLs improves power saving of a system because instead of using DPUs at the highest SL which use a lot of power, requests that require less DPU utilization can be handled by DPUs operating at lower service levels which consume less power.

In step 408, the DPU provisioning engine (e.g., 130 in FIG. 1) combines the forecast of the primary storage array (e.g., 110 in FIG. 1) and the forecast of the secondary storage array (e.g., 120 in FIG. 1) to obtain a combined forecast. It should be appreciated, that the combined forecast accounts for the secondary storage array's (e.g., 120 in FIG. 1) workload including the requests it may receive from the primary storage array (e.g., 110 in FIG. 1). It should be further appreciated, that by analyzing the requests of both arrays in combination, the DPU provisioning engine (e.g., 130 in FIG. 1) can better prepare the secondary storage array (e.g., 120 in FIG. 1) to handle any additional requests it may receive from the primary storage array (e.g., 110 in FIG. 1) as described below in FIG. 4.2. In one or more embodiments, the DPU provisioning engine (e.g., 130 in FIG. 1) may combine the forecast of the primary storage array (e.g., 110 in FIG. 1) and the forecast of the secondary storage array (e.g., 120 in FIG. 1) by any means known to in the art or discovered in the future.

In one or more embodiments, following step 408 the method proceeds to step 410 in FIG. 4.2.

Turning to FIG. 4.2, FIG. 4.2 shows a flowchart of a method for adjusting data processing unit (DPU) utilization of a secondary storage array (e.g., 120 in FIG. 1) in accordance with one or more embodiments disclosed herein. The method may be performed by, for example, a DPU provisioning engine (e.g., 130 in FIG. 1). Other components in the system may perform this method without departing from the scope of the disclosure.

While the various steps in the flowchart shown in FIG. 4.2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 410, the DPU provisioning engine (e.g., 130 in FIG. 1) determines whether any SLs of the secondary DPU core matrix (e.g., 122 in FIG. 1) are out of compliance based on a combined forecast (i.e., a combination of a forecast of a primary storage array's (e.g., 110 in FIG. 1) and a secondary storage array's (e.g., 120 in FIG. 1) workload. In one or more embodiments, the combined forecast is the same combined forecast from step 408 in FIG. 4.1. In one or more embodiments, the DPU provisioning engine (e.g., 130 in FIG. 1) makes this determination by determining whether the DPUs at each service level (SL) are sufficient to handle the requests received by the secondary storage array (e.g., 120 in FIG. 1). In one or more embodiments, if the requests collectedly require more DPUs than are available at a particular SL causing a decline in response time due to the bottlenecking of requests, then that SL is out of compliance. Conversely, if there is a minimal amount of request being handled by a particular SL resulting in a response time that is above a predetermined threshold, then that particular SL is out of compliance. In one or more embodiments, the predetermined threshold may be determined by any means known in the art or discovered in the future. In one or more embodiments, the DPU provisioning engine (e.g., 130 in FIG. 1) may determine whether any SLs are out of compliance by any means known in the art or discovered in the future. Accordingly, if the result is YES, the method proceeds to step 412. If the result is NO, the method ends.

In step 412, the DPU provisioning engine (e.g., 130 in FIG. 1) determines whether the highest out of compliance SL (HOOC SL) of the secondary DPU core matrix (e.g., 122 in FIG. 1) is below compliance. In one or more embodiments, if the requests collectively require more DPUs than are available at a particular SL resulting in a drop in the response time below a predetermined threshold, then the HOOC SL is below compliance. Conversely, if there is a minimal amount of requests being handled by the HOOC SL resulting in a response time above a predetermined threshold, then that particular HOOC SL is above compliance. In one or more embodiments, the DPU provisioning engine (e.g., 130 in FIG. 1) may make this determination by any means known in the art or discovered in the future. It should be appreciated, that if it is determined that the HOOC SL is not below compliance, then it is above compliance. Accordingly, if the result is YES then the method proceeds to step 414. If the result is NO then the method proceeds to step 422.

As a result of the determination that the HOOC SL is below compliance in step 412, the method arrives at step 414. In step 414, the DPU provisioning engine (e.g., 130 in FIG. 1) determines whether there is an SL available in the in the secondary DPU core matrix (e.g., 122 in FIG. 1) that is lower the HOOC SL (i.e., whether the HOOC SL is the lowest SL in the secondary DPU core matrix (e.g., 122 in FIG. 1)). In a non-limiting example, in a DPU core matrix (e.g., 122 in FIG. 1) with SLs ranked in ascending order: Bronze, Silver, Gold, Platinum, and Diamond, where Bronze is the lowest SL and Diamond is the highest SL, if the HOOC SL was Gold, then the lower SLs would be Silver and Bronze thus the result would be YES. Conversely, if the HOOC SL is Bronze, then there are no lower SLs thus the result would be NO. In one or more embodiments, the DPU provisioning engine (e.g., 130 in FIG. 1) may make this determination by any means known in the art or discovered in the future. Accordingly, if the result is YES, then the method proceeds to step 416. If the result is NO, then the method proceeds to step 420.

As a result, of the determination that there is an SL that is lower than the HOOC SL available in the in the secondary DPU core matrix (e.g., 122 in FIG. 1) in step 414, the method arrives at step 416. In step 416, the DPU provisioning engine (e.g., 130 in FIG. 1) instructs the secondary DPU core matrix (e.g., 122 in FIG. 1) to move DPUs in SLs lower than the HOOC SL to the same SL as the HOOC SL until the input-output per second (IOPS) and response time of the HOOC SL is above a predetermined threshold (i.e., back in compliance) and an array threshold. In one or more embodiments, the array threshold is a threshold that is established to ensure that the DPUs in the secondary DPU core matrix (e.g., 122 in FIG. 1) of the secondary storage array (e.g., 120 in FIG. 1) maintain a minimum operational level so that the secondary storage array (e.g., 120 in FIG. 1) is prepared to handle any additional requests that may be sent from the primary storage array (e.g., 110 in FIG. 1). In one or more embodiments, the predetermined threshold may be determined by any means known in the art including but not limited to, specifications sent by the entity (e.g., host IOs, backup IOs, replication IOs, etc.) sending the requests to the secondary storage array (e.g., 120 in FIG. 1), manufacture specifications, company policies, machine learning, etc. In one or more embodiments, moving a DPU to higher or lower SL refers to increasing or decreasing the clock speed of the DPUs respectively to match the clock speed of DPUs operating in higher or lower SLs. In one or more embodiments, the DPU provisioning engine (e.g., 130 in FIG. 1) prioritizes moving DPUs that are lower but closer in rank to the HOOC SL rather than moving SLs from the lowest SL to conserve power. Continuing with the non-limiting example in step 414, if the HOOC SL is Gold, the system may move DPUs from Silver to Gold before moving DPUs from Bronze to Gold. In one or more embodiments, following step 416 the method proceeds to step 418.

As a result, of the determination that there is not an SL that is lower than the HOOC SL available in the in the secondary DPU core matrix (e.g., 122 in FIG. 1) in step 414, the method arrives at step 420. In step 420, the DPU provisioning engine (e.g., 130 in FIG. 1) alerts the system that more DPUs are needed in the secondary DPU core matrix (e.g., 122 in FIG. 1) to handle the requests received by the secondary storage array (e.g., 120 in FIG. 1). In one or more embodiments, the DPU provisioning engine (e.g., 130 in FIG. 1) may alert a user via a graphical user interface (GUI) on an edge device (e.g., 100 in FIG. 1).

In one or more embodiments, the method may end following step 420.

As a result of the determination that the HOOC SL is not below compliance in step 412, the method arrives at step 422. It should be appreciated, that the HOOC SL is above compliance in step 422 because it was determined that it was not below compliance in step 412. In step 422, the DPU provisioning engine (e.g., 130 in FIG. 1) determines whether the HOOC SL is below the array threshold. In one or more embodiments, the array threshold is a threshold established to ensure that the DPUs in the secondary DPU core matrix (e.g., 122 in FIG. 1) of the secondary storage array (e.g., 120 in FIG. 1) maintain a minimum operational level so that the secondary storage array (e.g., 120 in FIG. 1) is prepared to handle any additional requests that may be sent from the primary storage array (e.g., 110 in FIG. 1). It should be appreciated, that by maintaining the array threshold, the secondary storage array (e.g., 120 in FIG. 1) protects against unexpected bottlenecks caused by sudden surges in requests from the primary storage array (e.g., 110 in FIG. 1). In one or more embodiments, the array threshold corresponds to the response time of each SL of the secondary DPU core matrix (e.g., 122 in FIG. 1). In one or more embodiments, the array threshold may be calculated using the combined forecast. It should be appreciated, that the combined forecast considers both the anticipated workload of the secondary storage array (e.g., 120 in FIG. 1) and any potential request offloading from the primary storage array (e.g., 110 in FIG. 1), ensuring that the array threshold is set to accommodate both the local and external demands. In one or more embodiments, the array threshold may be calculated using any machine learning algorithms known in the art or discovered in the future. In one or more embodiments, the array threshold may be calculated by any means known in the art or discovered in the future. In one or more embodiments, the DPU provisioning engine (e.g., 130 in FIG. 1) may determine whether the HOOC SL is below the array threshold by any means known in the art or discovered in the future. Accordingly, if the result is YES then the method proceeds to step 416. If the result is NO, then the method proceeds to step 424.

As a result of the determination that the HOOC SL is not below the array threshold in step 422, the method arrives at step 424. In step 424, the DPU provisioning engine (e.g., 130 in FIG. 1) instructs the secondary DPU core matrix (e.g., 122 in FIG. 1) to move DPUs in the HOOC SL to lower SLs of the secondary DPU core matrix (e.g., 122 in FIG. 1) until the response time of the HOOC SL is below a predetermined threshold or meets the array threshold. In one or more embodiments, the DPU provisioning engine (e.g., 130 in FIG. 1) is configured to prioritize power savings by moving DPUs in the HOOC SL to the lowest SL in the secondary DPU core matrix (e.g., 122 in FIG. 1). It should be appreciated, that the HOOC SL being above compliance is an indicator of underutilization of the DPUs due to insufficient workload. It should be further appreciated, that in such scenarios, moving DPUs to lower SL can reduce power consumption. In one or more embodiments, the predetermined threshold may be determined by any means known in the art including but not limited to specifications sent by the entity (e.g., host IOs, backup IO, replication IOs, etc.) sending the requests to the secondary storage array (e.g., 120 in FIG. 1), manufacture specifications, company policies, machine learning, etc. In one or more embodiments, moving a DPU to higher or lower SL refers to increasing or decreasing the clock speed of the DPUs respectively to match the clock speed of DPUs operating in higher or lower SLs. The method then proceeds to step 418.

In one or more embodiments, the method may arrive at step 418 from step 416 or step 424. In step 418, the DPU provisioning engine (e.g., 130 in FIG. 1) determines whether there are any more SL of the secondary DPU core matrix (e.g., 122 in FIG. 1) to check for compliance. In one or more embodiments, unless the HOOC SL was the lowest SL, there are more SLs to check for compliance. In a non-limiting example, if the HOOC SL was Gold, then the DPU provisioning engine (e.g., 130 in FIG. 1) still needs to check the compliance of the Silver and Bronze SLs. In one or more embodiments, the moving of the DPUs to higher and lower SLs may have an impact on the compliance of the other SL in the secondary DPU core matrix (e.g., 122 in FIG. 1). In one or more embodiments, the DPU provisioning engine (e.g., 130 in FIG. 1) may make this determination by any means known in the art or discovered in the future. Accordingly, if the result is YES, then the method proceeds to step 410. If the result is NO, then the method ends. In one or more embodiments, the method proceeds to step 410 until the result is NO.

In one or more embodiments, the method may end following step 418.

Embodiments of the disclosure may be implemented using computing devices. Turning to FIG. 5, FIG. 5 shows a diagram of a computing device (500) in accordance with one or more embodiments. The computing device (500) may include one or more computer processor(s) (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), input devices (510), output devices (512), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, access keyboard, mouse, microphone, touchpad, electronic pen, or any other type of input device. The communication interface (508) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment, the computing device (500) may include one or more output devices (512), such as a screen (e.g., a liquid crystal display (LCD), a plasma display, touchscreen, cathode ray tube (CRT) monitor, projector, or other display device), a printer, external storage, or any other output device. One or more of the output devices (512) may be the same or different from the input devices (510). The input and output device(s) (510, 512) may be locally or remotely connected to the computer processor(s) (502), non-persistent storage (504), and persistent storage (506). Many diverse types of computing devices exist, and the aforementioned input and output device(s) (510, 512) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

In the detailed description of the embodiments of the disclosure above, numerous specific details are set forth in order to provide a more thorough understanding of one or more embodiments of the disclosure. However, it will be apparent to one of ordinary skill in the art that the one or more embodiments of the disclosure may be practiced without these specific details. In other instances, well-known features have not been described in detail to avoid unnecessarily complicating the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precedes) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims below.

What is claimed is:

1. A method for adjusting data processing unit (DPU) utilization of a storage array, the method comprising:
   sampling input-output (IO) of the storage array;
   forecasting, based on the sampling, demand for the storage array, wherein the storage array comprises a DPU core matrix;
   making a first determination, based on the forecasting, that at least one service level (SL) of a plurality of SLs associated with the DPU core matrix is out of compliance;
   identifying, based on the first determination, at least one DPU of the DPU core matrix currently operating at a first SL; and
   adjusting, based on the identifying, operation of the at least one DPU to operate from the first SL to a second SL of the plurality of SLs.

2. The method of claim 1, the method further comprises:
   prior to adjusting:
      making a second determination, based upon the first determination, that a response time associated with the at least one SL is below a predetermined threshold, and wherein the second SL is the at least one SL.

3. The method of claim 2, wherein adjusting the at least one DPU comprises:
   changing a first clock speed of the at least one DPU to a second clock speed associated with the at least one SL.

4. The method of claim 3, wherein the second clock speed is faster than the first clock speed.

5. The method of claim 2, further comprising:
   after adjusting:

making a third determination, based on the forecasting, that a third SL of the plurality of SLs is out of compliance, wherein the third SL is lower than the second SL;
      making a fourth determination, based on the third determination, that the third SL is above a threshold compliance; and
      adjusting, based on the fourth determination, operation of at least a second DPU associated with the third SL to a fourth SL of the plurality of SLs, wherein the fourth SL is lower than the third SL.

6. The method of claim 5, wherein the fourth SL is the lowest SL of the plurality of SLs.

7. The method of claim 2, wherein adjusting the operation of the DPU core matrix comprises:
   making a fifth determination, based on the forecasting, that a fifth SL of the plurality of SLs is out of compliance, wherein the fifth SL is the lowest SL of the plurality of SLs; and
   alerting, based on the fifth determination, a user that current settings of the DPU core matrix are unable to provide compliance for all of the plurality of SLs.

8. The method of claim 7, wherein alerting comprises sending the user a message via a graphical user interface (GUI).

9. A non-transitory computer readable medium (CRM) comprising computer readable program code, which when executed by a computer processor, enables the computer to perform a method for adjusting data processing unit (DPU) utilization of a storage array, the method comprising:
   sampling input-output (IO) of the storage array;
   forecasting, based on the sampling, demand for the storage array, wherein the storage array comprises a DPU core matrix;
   making a first determination, based on the forecasting, that at least one service level (SL) of a plurality of SLs associated with the DPU core matrix is out of compliance;
   identifying, based on the first determination, at least one DPU of the DPU core matrix currently operating at a first SL; and
   adjusting, based on the identifying, operation of the at least one DPU to operate from the first SL to a second SL of the plurality of SLs.

10. The non-transitory CRM of claim 9, the method further comprises:
   prior to adjusting:
      making a second determination, based upon the first determination, that a response time associated with the at least one SL is below a predetermined threshold, and wherein the second SL is the at least one SL.

11. The non-transitory CRM of claim 10, wherein adjusting the at least one DPU comprises:
   changing a first clock speed of the at least one DPU to a second clock speed associated with the at least one SL.

12. The non-transitory CRM of claim 11, wherein the second clock speed is faster than the first clock speed.

13. The non-transitory CRM of claim 10, further comprising:
   after adjusting:
      making a third determination, based on the forecasting, that a third SL of the plurality of SLs is out of compliance, wherein the third SL is lower than the second SL;
      making a fourth determination, based on the third determination, that the third SL is above a threshold compliance; and adjusting, based on the fourth determination, operation of at least a second DPU associated with the third SL to a fourth SL of the plurality of SLs, wherein the fourth SL is lower than the third SL.

14. The non-transitory CRM of claim 13, wherein the fourth SL is the lowest SL of the plurality of SLs.

15. The non-transitory CRM of claim 10, wherein adjusting the operation of the DPU core matrix comprises:

making a fifth determination, based on the forecasting, that a fifth SL of the plurality of SLs is out of compliance, wherein the fifth SL is the lowest SL of the plurality of SLs; and alerting, based on the fifth determination, a user that current settings of the DPU core matrix are unable to provide compliance for all of the plurality of SLs.

16. A system for adjusting data processing unit (DPU) utilization of a storage array, the system comprising:

persistent storage; and a computing device, comprising a processor and memory, programmed to:

sample input-output (IO) of the storage array;

forecast, based on the sampling, demand for the storage array, wherein the storage array comprises a DPU core matrix;

make a first determination, based on the forecasting, that at least one service level (SL) of a plurality of SLs associated with the DPU core matrix is out of compliance;

identify, based on the first determination, at least one DPU of the DPU core matrix currently operating at a first SL; and adjust, based on the identifying, operation of the at least one DPU to operate from the first SL to a second SL of the plurality of SLs.

17. The system of claim 16, wherein the computing device is further programmed to:

prior to adjusting:

make a second determination, based upon the first determination, that a response time associated with the at least one SL is below a predetermined threshold, and wherein the second SL is the at least one SL.

18. The system of claim 17, wherein adjusting the at least one DPU comprises:

changing a first clock speed of the at least one DPU to a second clock speed associated with the at least one SL.

19. The system of claim 18, wherein the second clock speed is faster than the first clock speed.

20. The system of claim 17, wherein the computing device is further programmed to:

after adjusting:

make a third determination, based on the forecasting, that a third SL of the plurality of SLs is out of compliance, wherein the third SL is lower than the second SL;

make a fourth determination, based on the third determination, that the third SL is above a threshold compliance; and adjust, based on the fourth determination, operation of at least a second DPU associated with the third SL to a fourth SL of the plurality of SLs, wherein the fourth SL is lower than the third SL.

\* \* \* \* \*